United States Patent
Teng et al.

(10) Patent No.: US 11,758,016 B2
(45) Date of Patent: Sep. 12, 2023

(54) HOSTED APPLICATION AS WEB WIDGET TOOLKIT

(71) Applicant: VMware, Inc., Palo Alto, CA (US)

(72) Inventors: Shengbo Teng, Beijing (CN); Sam Zhao, Beijing (CN); Wen Wang, Beijing (CN); Nan Wang, Beijing (CN); Jingtao Zhang, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 677 days.

(21) Appl. No.: 15/875,161

(22) Filed: Jan. 19, 2018

(65) Prior Publication Data

US 2019/0230188 A1     Jul. 25, 2019

(51) Int. Cl.
| | |
|---|---|
| H04L 67/60 | (2022.01) |
| H04L 67/08 | (2022.01) |
| H04L 65/61 | (2022.01) |
| H04L 67/01 | (2022.01) |
| H04L 9/40 | (2022.01) |
| H04L 65/00 | (2022.01) |
| H04L 67/04 | (2022.01) |
| H04L 67/02 | (2022.01) |
| G06F 9/00 | (2006.01) |

(Continued)

(52) U.S. Cl.
CPC ............... *H04L 67/60* (2022.05); *G06F 9/00* (2013.01); *G06F 16/00* (2019.01); *H04L 63/08* (2013.01); *H04L 65/00* (2013.01); *H04L 65/61* (2022.05); *H04L 67/02* (2013.01); *H04L 67/04* (2013.01); *H04L 67/08* (2013.01); *H04N 21/00* (2013.01); *H04L 67/01* (2022.05)

(58) Field of Classification Search
CPC ............................... H04L 67/32; H04L 63/08
See application file for complete search history.

(56) References Cited

U.S. PATENT DOCUMENTS

| | | | | |
|---|---|---|---|---|
| 8,743,130 B2* | 6/2014 | Mahajan | ................. | G06T 11/60 345/502 |
| 2004/0123148 A1* | 6/2004 | Offermann | .......... | H04L 63/0428 726/5 |

(Continued)

FOREIGN PATENT DOCUMENTS

CA     2791117 A1 *  3/2013  ............. A63F 13/30

*Primary Examiner* — Nicholas R Taylor
*Assistant Examiner* — Sm Z Islam
(74) *Attorney, Agent, or Firm* — Thomas Horstemeyer, LLP

(57) ABSTRACT

Embodiments of the present disclosure relate to techniques for providing a remoted application to a client device over a network. Certain embodiments involve receiving, by a web server and from the client device, a request for the remoted application. The request may comprise a tag which identifies one or more attributes of the remoted application. Embodiments further involve launching, by the web server and based on the tag, the remoted application. Embodiments further involve providing, by the web server and to the client device, a video stream of the remoted application. The video stream of the remoted application may comprise one or more images rendered based on raw data of the remoted application. Embodiments further involve receiving, by the web server and from the client device, user input and providing, by the web server and based on the user input, application input to the remoted application.

20 Claims, 5 Drawing Sheets

(51) Int. Cl.
*H04N 21/00* (2011.01)
*G06F 16/00* (2019.01)

(56) References Cited

U.S. PATENT DOCUMENTS

| | | | |
|---|---|---|---|
| 2009/0162828 A1* | 6/2009 | Strachan | G06F 16/4393 |
| | | | 434/350 |
| 2011/0225417 A1* | 9/2011 | Maharajh | G06F 21/10 |
| | | | 713/150 |
| 2012/0113103 A1* | 5/2012 | Kim | G06T 15/00 |
| | | | 345/419 |
| 2014/0026057 A1* | 1/2014 | Kimpton | G06F 9/451 |
| | | | 715/733 |
| 2015/0011311 A1* | 1/2015 | Relan | A63F 13/30 |
| | | | 463/31 |

\* cited by examiner

HOSTED APPLICATION AS WEB WIDGET TOOLKIT

BACKGROUND

Software applications can be consumed on a variety of devices, including desktop computers, laptop computers, tablet computers, smartphones, and the like. These applications may, for example, be native applications (e.g., applications for which an executable file is built specifically for that platform and executed on a local device) or web applications which are remotely hosted and executed on a web server, and which a user may interact with from a client device using a web browser.

Some types of applications may not be well-suited for implementation as web applications, such as those involving three-dimensional graphics (e.g., objects composed of information describing geometry, viewpoint, texture, lighting, shading, and the like, which are rendered into a final image for display based on the information), as they require large amounts of local processing and memory resources of a local device to render the three-dimensional graphics. For example, data for rendering a single three-dimensional graphic object may be large in size (e.g., around one gigabyte) and therefore utilize significant memory resources to store the data, and further significant processor (e.g., graphics processing unit (GPU)) resources to process the data to render the 3D object. Further, where the three-dimensional graphics are provided over a network (e.g., as part of web application) the size of the data may utilize significant network resources to communicate the data between the local device and a source of the data (e.g., a web server). Furthermore, existing techniques of providing web applications, such as the use of Javascript, do not allow for rendering three-dimensional content. As such, these types of applications may not be well suited to be provided as web applications. There exists, therefore, a need for improved techniques of providing resource-intensive applications over the web which reduce the usage of local resources (e.g., processor, memory, etc.) for running the resource-intensive applications.

DETAILED DESCRIPTION

Figure 1:
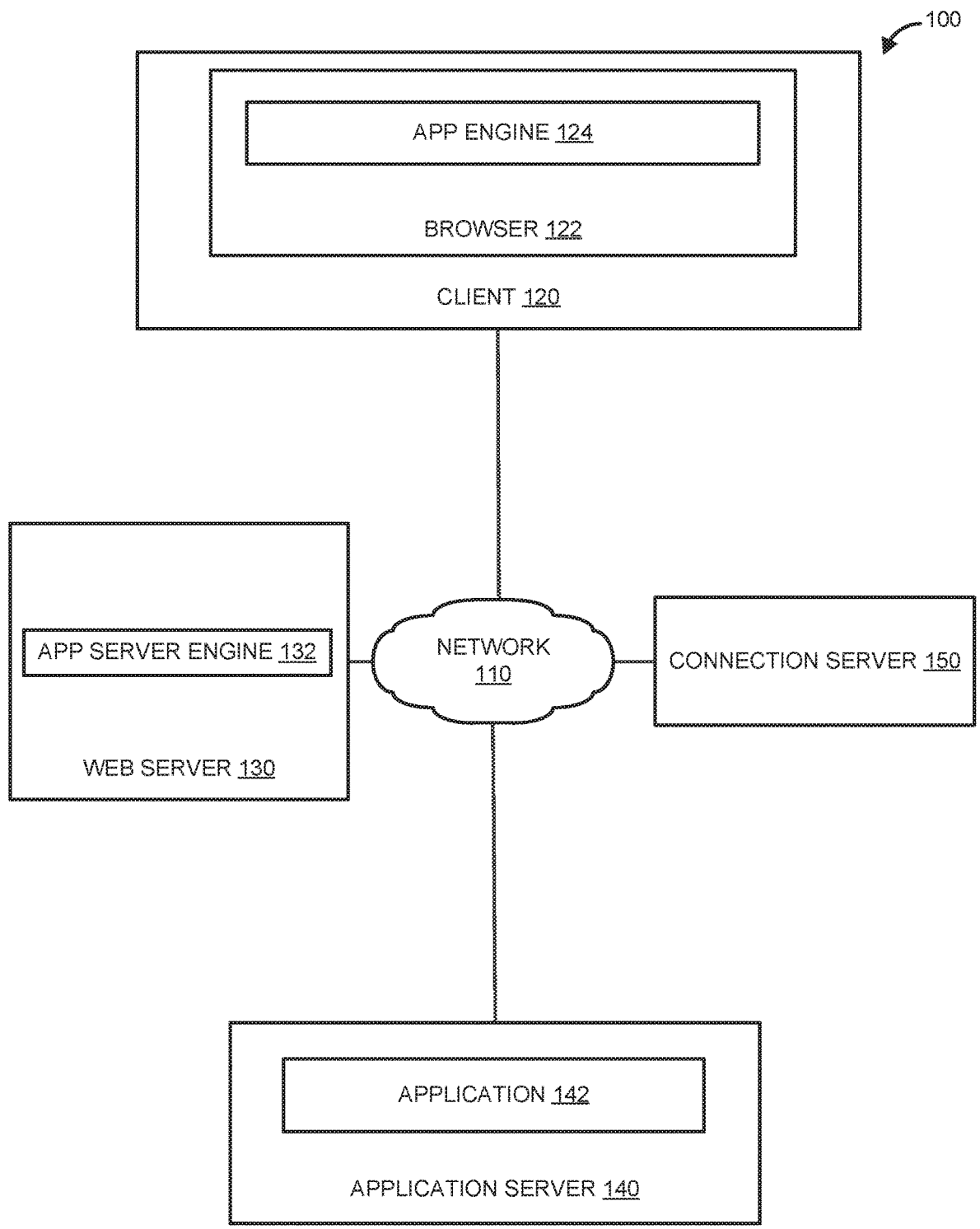
FIG. 1 illustrates components of an example computing environment in which an embodiment may be implemented.

Embodiments presented herein relate to techniques for providing an application (e.g., a resource-intensive application) over a network. In certain embodiments, a toolkit may be provided which allows a resource-intensive application to be provided within a web application running on a web server to a client device via a video stream over a network from the web server. References in this disclosure to "resource-intensive applications" may refer to applications which use large amounts of processing and/or storage resources, such as those involving three-dimensional graphics. References in this disclosure to "remoted applications" may refer to applications which are executed using resources of computing devices remote from client devices to which the remoted applications are provided. Remoted applications may, for example, be resource-intensive applications. According to embodiments of the present disclosure, a toolkit may comprise a set of basic building units for use in developing applications, such as web applications. For example, the toolkit may include one or more tags, such as HyperText Markup Language (HTML) tags, as well as one or more methods, such as Javascript controls. The toolkit may allow developers to include a resource-intensive application within a web application which may be provided as a remoted application to a client device over a network, such as through a web browser. For example, the resource-intensive application may be included as a web widget within the web application using elements of the toolkit. A web widget may generally refer to a small application with specific functionality that can be accessed within a web page or web application by an end user. A web widget is generally a transient or auxiliary application, meaning that it just occupies a portion of a webpage or web application, and performs one or more functions based on information retrieved from remote sources. A developer may, for example, use an application tag of the toolkit to define aspects of a resource-intensive application for inclusion as a web widget within a web application. The application tag may, for example, comprise a plurality of attributes relating to an application (e.g., the resource-intensive application), such as an identifier (e.g., a numerical or textual identifier for the application), a source (e.g., a locator of the application, such as a uniform resource locator of a network location at which the application is hosted and may be accessed), a type (e.g., a platform on which the application is based, such as VMWare® Horizon®, VMWare® ThinApp®, Windows® published app, or the like), one or more controls, and the like. The one or more controls may, for example, invoke methods such as Javascript controls which control aspects of the application. The controls may comprise, for example, "open", "new", "save", "full-screen", "close", "send", "read", and the like.

According to embodiments, a user of a client device may access a remotely-hosted web application using a browser. The web application may include a remoted application (e.g., a resource-intensive application) defined using an application tag of a toolkit according to techniques described herein. In some embodiments, the remoted application may be included as a web widget within the web application. The client device may request the remoted application from a web server using the application tag. The web server may read the tag and launch the remoted application. In some embodiments, the remoted application may be hosted on an application server separate from the web server. In alternative embodiments, the remoted application may be hosted on the web server, or the application server and the web server may be included within the same device. Once the remoted application has been launched, the web server may receive raw data from the application and render a video stream of the remoted application based on the raw data and provide the video stream to the client device. Raw data of application 142 may, for example, comprise information describing geometry, viewpoint, texture, lighting, shading, and the like for three-dimensional graphics, as well as information describing additional elements such as text. Rendering a video stream from raw data of an application may comprise, for example, building a composite scene based on all of the visual elements described in the raw data and encoding the composite scene into a series of images. For example, the video stream may be rendered and provided using a protocol such as Blast®, HyperFlex®, remote desktop protocol (RDP)®, or the like. The user of the client device may access the video stream of the remoted application using a browser of the client device, and may provide input using, for example, a mouse, keyboard, and/or other input devices of the client device. For example, the user may interact with the web widget through which the video stream of the remoted application is provided as if the user were interacting directly with the remoted application. The input may be received by the client device through one or more controls defined using the application tag, and may be provided using the application tag to the web server. The web server may read the tag and provide application input to the remoted application (e.g., hosted on the application server) based on the input received from the user. For example, the user's input may invoke a control which performs a particular action in the remoted application. The web server may continue to render and provide a video stream of the remoted application to the client based on the raw data of the remoted application, including real-time updates based on the user's input.

In certain embodiments, trust between the web server and the application server may be established though the use of a separate authentication server. Alternatively, the web server and the application server may have a directly-established trust relationship. In some embodiments, the web server and the application server may communicate through a connection server, which may be trusted by both. In other embodiments, the web server and the application server may both be part of a single device, such as a windows server.

FIG. 1 illustrates components of a computing environment 100 in which embodiments of the present disclosure may be implemented. As shown, system 100 includes client 120, web server 130, application server 140, and connection server 150, connected by network 110 (e.g., the internet).

Client 120 may comprise a physical or virtual computing device such as a laptop or desktop computer, mobile phone, tablet, personal digital assistant (PDA), server, or the like, connected to network 110. As shown, client 120 comprises a browser 122, which may be a web browser. Included within browser 122 is an application engine 124, which may, for example, comprise a browser plugin or native browser component which performs operations related to communication between client 120 and web server 130 (e.g., through application server engine 132) for providing a remoted application such as a resource-intensive application to browser 122. For example, when a user launches a web application comprising an application tag defining a resource-intensive application according to techniques described herein, app engine 124 may request the resource-intensive application from web server 130, such as by providing the application tag to app server engine 132. In response, web server 130 may launch the resource-intensive application, render a video stream of the resource-intensive application based on raw data of the resource-intensive application, and provide the video stream to app engine 124 (e.g., the video stream may be provided by app server engine 132 to app engine 124, and may be received via a web socket associated with client 120).

The user of client 120 may view the video stream though browser 122 (e.g., in a web widget of the web application), and may provide input through controls defined in the application tag, such as by using a mouse and/or keyboard to interact with the resource-intensive application (e.g., using clicks, drag-and drop actions, text entry, and the like, with respect to the video stream). App engine 124 may receive the input, and may provide the input to app server engine 132 (e.g., via the controls in the application tag). App server engine 132 may receive the input and provide application input to the resource-intensive application based on the input (e.g., by invoking methods associated with the controls). Web server 130 may continue to render and provide the video stream of the resource-intensive application to client 120 as the resource-intensive application receives and responds to input from the user, thus providing the user with a seamless experience of viewing and interacting with the resource-intensive application through browser 122.

In one example, the application tag which is included by a developer within the web application and encountered by client 120 when interacting with the web application through browser 122 is opened using "<app>" and closed using "</app>". Attributes may be defined within the "<app>" tag. For example, an application tag included within a web application may appear as follows:

```
<app id= "3DGraphicsApp" width= "640" height= "480"
source= "https://appserver/3DGraphicsApp" type= "thinapp"
controls= "open, new, save, close">
Your browser does not support the "app" tag. Please install browser
plugin or change to supported browser.
</app>
```

The text between "<app>" and "</app>" may only be displayed in browsers that do not support the <app> element. For example, a browser which does not have a browser plugin or native browser component for app engine 124 may display the text "Your browser does not support the "app" tag. Please install browser plugin or change to supported browser."

The example application tag shown above defines an application with an identifier of "3DGraphicsApp," which is to be displayed in a 640×480 web widget within a web application. The application is hosted at the URL "https://appserver/3DGraphicsApp" and its type is a VMWare® ThinApp® application. Controls provided within the web widget include open (e.g., launch application in browser), new (e.g., launch new instance of application), save (e.g., save application state for user), and close (e.g., close application). The controls may invoke methods of the application so that user input to the controls through browser 122 is translated by web server 130 into input to the application. App engine 124 may be provided as a browser plugin or native browser component for browser 122, and may receive and process the application tag as described herein. The application tag and controls may be provided as part of a toolkit which is used by a developer in developing a web application hosted on web server 130.

Web server 130 may comprise a physical or virtual computing device such as a rack server, desktop or laptop computer, mobile device, or the like. As shown, web server 130 comprises an app server engine 132, which may perform operations related to communication between web server 130 and client 120 for providing a resource-intensive application to browser 122. For example, app server engine 132 may receive a request from app engine 124 for a resource-intensive application (e.g., through an application tag encountered in a web application). App server engine 132 may process the application tag in order to identify and launch the resource-intensive application according to parameters defined in the application tag. For example, app server engine 132 may instruct application server 140 to launch the resource-intensive application (e.g., application 142). App server engine 132 may then receive raw data from application 142 in order to render and provide a video stream of application 142 to browser 122 based on the raw data. For example, app server engine 132 may render and provide the video stream using a streaming protocol such as Blast or RDP. App server engine 132 may further receive input from app engine 124 (e.g., provided by a user of client device 120 through controls identified in the application tag). App server engine 132 may process the input in order to provide application input to application 142. For example, app server engine 132 may invoke methods associated with controls identified in the application tag based on the user input associated with these controls. The controls may, for example, invoke methods of application 142. App server engine 132 may continue to render and provide the video stream of application 142 to app engine 124 as application 142 receives and responds to input.

Application server 140 may comprise a physical or virtual computing device such as a rack server, desktop or laptop computer, mobile device, or the like. As shown, application server 140 comprises an application 142, which is executed using local resources of application server 140. Application 142 may, for example, comprise a resource-intensive application such as an application involving three-dimensional graphics. As described herein, application 142 may be launched by app server engine 132, and may provide raw data to app server engine 132 to be used in rendering a video stream of application 142 for providing to browser 122. Application 142 may further receive and process input received from app server engine 132. In an alternative embodiment, application server 140 and web server 120 are part of a single device.

Connection server 150 may comprise a physical or virtual computing device such as a rack server, desktop or laptop computer, mobile device, or the like, and may facilitate communications between web server 130 and application server 140 in some embodiments. For example, in certain embodiments, all communications between web server 130 (e.g., from app server engine 132) and application server 140 are routed through connection server 150. Connection server 150 may, for example, be trusted by both web server 130 and application server 140, and may route communications between the two. In alternative embodiments, web server 130 and application server 140 communicate directly with one another, and connection server 150 is not used.

Embodiments of the present disclosure may be useful in a variety of contexts, such as, for example, developing web applications containing resource-intensive applications (e.g., three-dimensional graphics applications). Techniques described herein allow for resource-intensive applications to be provided to a user as part of web applications accessed through a client device, such as through a web browser. Other techniques, such as directly providing raw data of a resource-intensive application over a network such as the Internet, may not be practical due to the high demands such applications place on the resources of the client device. For example, a single three-dimensional object may use around one gigabyte of storage resources, which may make it very inefficient to continuously download three-dimensional content over the web. Furthermore, rendering three-dimensional graphics for display based on raw data by the client device requires significant amounts of local resources. As such, techniques described herein of rendering and providing a resource-intensive application as a video stream to a client device over a network, and allowing a user to interact with the application through input provided with respect to the video stream using controls provide a significant technical improvement by reducing the usage of resources, such as processing and memory resources, at the client device. Embodiments of the present disclosure allow remotely-hosted resource-intensive content to be provided to a client device over a network without placing a heavy burden on the local resources of the client device, thus improving the functioning of the client device and the system as a whole.

Furthermore, techniques described herein allow for more efficient and functional development of web applications. Toolkits according to the present disclosure allow developers to easily embed resource-intensive content within web applications, and provide users of the web applications with controls through which to interact with the resource-intensive content. Previous techniques do not allow for rendering three-dimensional content in web applications and, as such, the present disclosure represents a significant advancement in the field.

Figure 2:
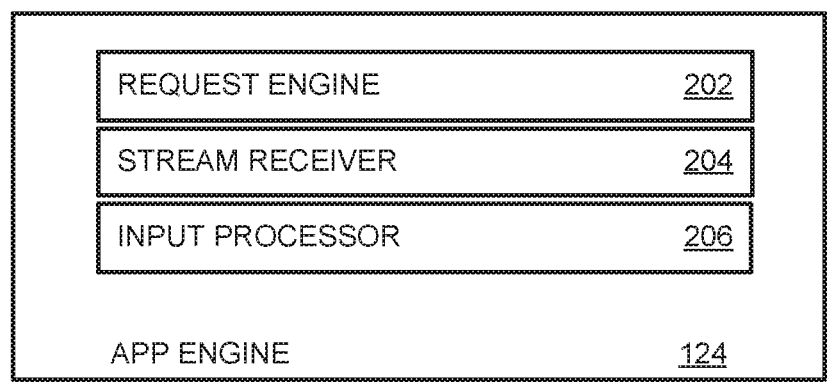
FIG. 2 illustrates components of an application engine, according to embodiments of the present disclosure.

FIG. 2 illustrates components of an app engine 124 in accordance with embodiments of the present disclosure. The components depicted in FIG. 2 are merely exemplary, and the functionality described as being performed by certain components may be performed by any number of local or remote components.

As shown, app engine 124 comprises request engine 202, stream receiver 204, and input processor 206. Request engine 202 may perform operations related to requesting resource-intensive applications from web server 130. For example, a user may interact with a web application through browser 122, and may navigate to a page which comprises an application tag describing a resource-intensive application (e.g., application 142). Request engine 202 may send a request, using the application tag, to web server web server 130 for the resource-intensive application. The web server 130 may launch the resource-intensive application (e.g., on application server 140), and then render and provide a video stream of the resource-intensive application to app engine 124. Stream receiver 204 may receive the video stream (e.g., via a web socket) and display it in browser 122. The user may view and interact with the resource-intensive application via the video stream in browser 122, and may provide input via controls defined in the application tag. Input processor 206 may receive user input via the controls, and may provide the input to web server 130. Web server 130 may provide the input to the resource-intensive application (e.g., on application server 140), and may continue to provide the video stream of the resource-intensive application to app engine 124 as the resource-intensive application responds to the input. The video stream may be received by stream receiver 204 on an ongoing basis so that the user is presented with a seamless experience of the resource-intensive application.

The components of app engine 124 collectively perform processing related to providing a resource-intensive application to a client device over a network, according to embodiments described herein. In alternative embodiments, certain tasks associated with components described herein may be performed by any number of local or remote components.

Figure 3:
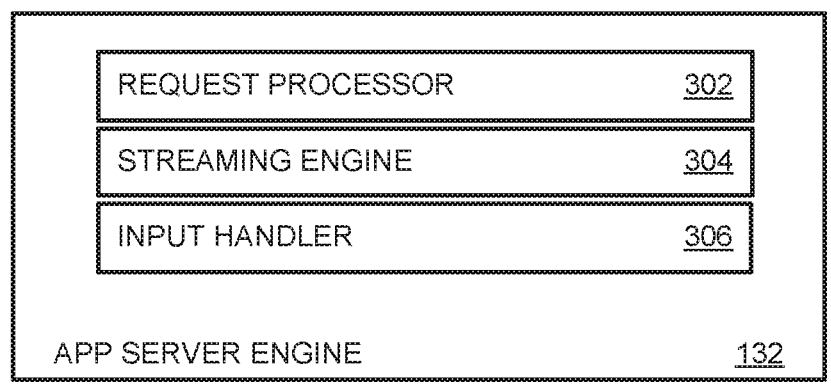
FIG. 3 illustrates components of an application server engine, according to embodiments of the present disclosure.

FIG. 3 illustrates example components of an app server engine 132 according to embodiments of the present disclosure. In the example shown, app server engine 132 includes a request processor 302, a streaming engine 304, and an input handler 306. Request processor 302 may perform operations related to receiving and handling requests from client 120, such as those sent by request engine 202. For example, request processor 302 may receive a request for a resource-intensive application from request engine 202. The request may comprise an application tag. Request processor 302 may parse the language of the request (e.g., the tag) to identify attributes of the resource-intensive application, such as an identifier, a class, a source (e.g., a locator of the application, such as a URL), a type, one or more controls, and the like. Upon identifying attributes of the resource-intensive application based on the request, request processor 302 may launch the resource-intensive application. In one embodiment, request processor 302 launches the resource-intensive application on application server 140.

Streaming engine 304 may perform operations related to providing a video stream of the resource-intensive application to client 120. For example, streaming engine may receive raw data from the resource-intensive application, and use the raw data to render and provide a video stream to client 120. Streaming engine 304 may render and provide the video stream using a protocol such as Blast or RDP. In some embodiments, streaming engine 304 provides the video stream to steam receiver 204. The video stream may comprise a live video rendition of the current screen of the resource-intensive application.

Input handler 306 may receive user input from client 120. For example input handler 306 may receive user input from input processor 206 via one or more controls defined in an application tag of the resource-intensive application. Input handler 306 may invoke one or more methods of the resource-intensive application based on the user input. For example, the one or more controls may be associated with functions that invoke functionality of the resource-intensive application, and request processor 302 may use these functions to provide the user input as application input to the resource-intensive application. Streaming engine 304 may continue to render and provide a video stream of the resource-intensive application to stream receiver 204 as the resource-intensive application responds to input.

The components of app server engine 132 collectively perform processing related to providing a resource-intensive application to a client device over a network, according to embodiments described herein. In alternative embodiments, certain tasks associated with components described herein may be performed by any number of local or remote components.

Figure 4:
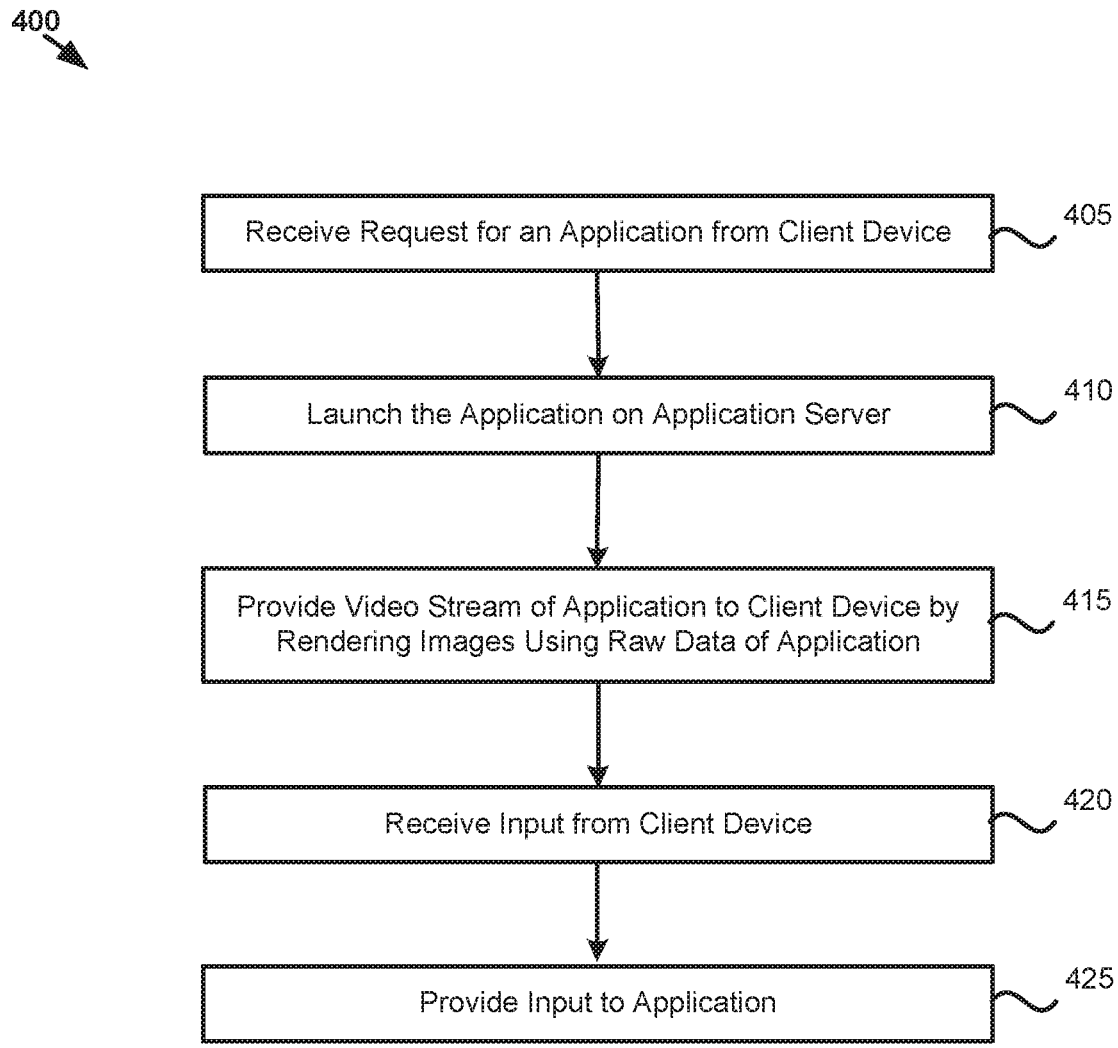
FIG. 4 illustrates example operations for providing a resource-intensive application over a network, according to embodiments of the present disclosure.

FIG. 4 illustrates operations 400 related to providing a resource-intensive application to a client device over a network, according to embodiments of the present disclosure. Operations 400 may, for example, be implemented by web server 130.

At 405, web server 130 receives a request for application 142 from client 120. The request may, for example, comprise an application tag encountered by client 120 in the course of accessing a web application through browser 122, and may define a resource-intensive application.

At 410, web server 130 launches application 142 on application server 140. For example, web server 410 may request application server 140 to launch application 142 according to parameters defined in the application tag. Application 142 may be executed using the resources of application server 140.

At 415, web server 130 provides a video stream of application 142 to client 120 by rendering a series of images based on raw data received from application 142. For example, web server 130 may make use of a protocol such as blast or RDP to render a video stream of the output of application 142 on an ongoing basis, and may provide the video stream to client 120 so that the user may view application 142, and provide input to application 142 using controls defined in the application tag.

At 420, web server 130 receives input from client 120. For example, a user of client 120 may provide input relative to the video stream of application 142 through browser 122 using controls defined in the application tag within the web application. Input may, for example, comprise clicks, touches, text, gestures, audio, and the like. Input may be received by web server 130 through the controls.

At 425, web server 130 provides the input to application 142. For example, web server 130 may process the input by invoking methods associate with application 142 based on the controls though which the user provided the input. For example, a control may comprise a wrapper around one or more methods of application 142, and web server 130 may translate the user input into application input by invoking those methods according to the parameters of the user input. As the user provides input, web server 130 may continue to render and provide a live video stream of the output of application 142 so that the user will continue to see the output of application 142 as it responds to the input.

Figure 5:
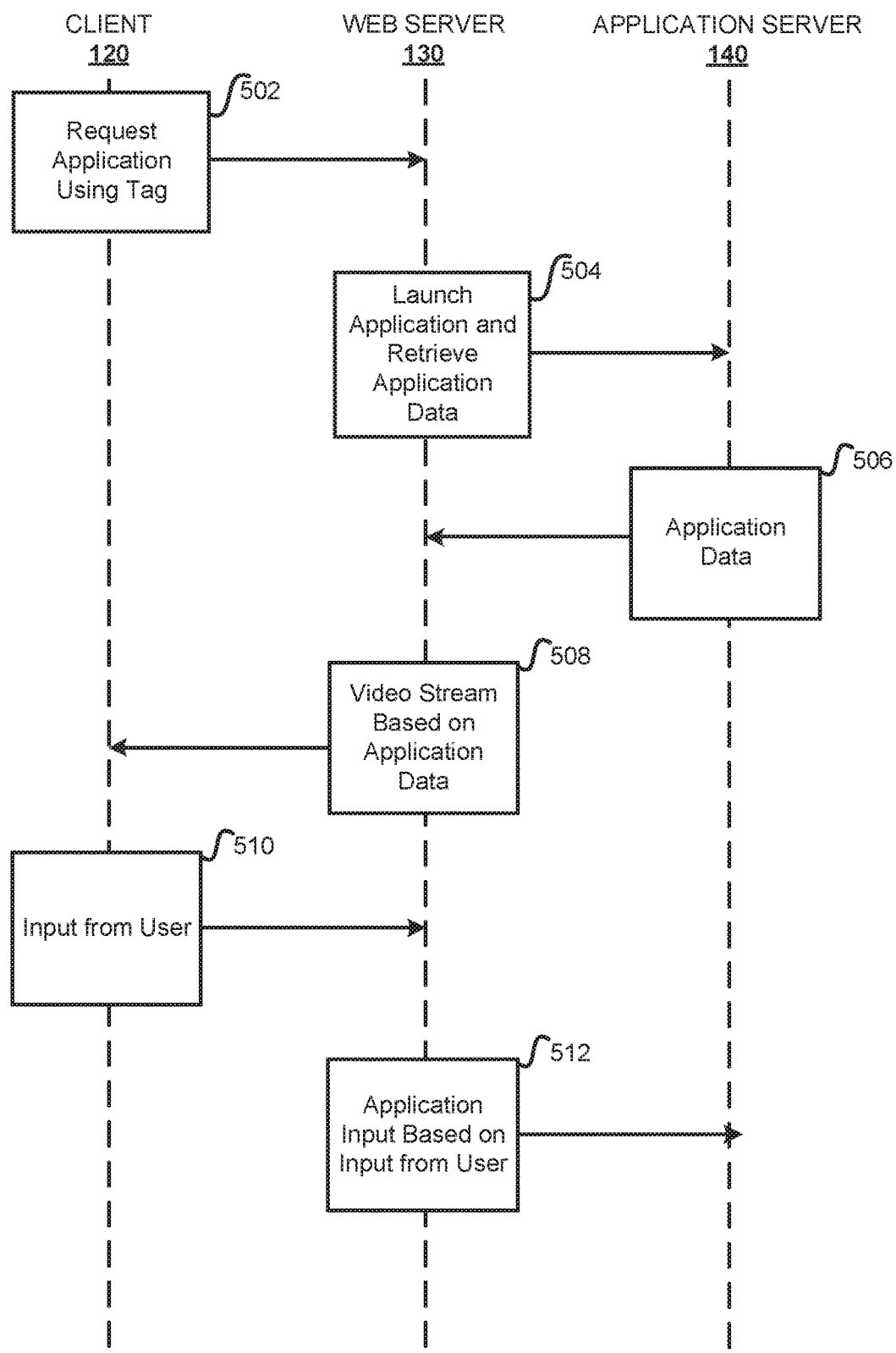
FIG. 5 illustrates an example data flow between a client, a web server, and an application server for providing a resource-intensive application over a network, according to embodiments of the present disclosure.

FIG. 5 illustrates an example message flow 500 between a client 120, a web server 130, and an application server 140, according to embodiments of the present disclosure. The messages in message flow 500 may, for example, be exchanged over network 110.

At 502, client 120 requests application 142 from web server 130 via an application tag. The application 142 may, for example, comprise a resource-intensive application.

At 504, web server 130 launches application 142 on application server 140 and retrieves raw data from application 142.

At 506, application 140 provides the raw data of the application to web server 130. The raw data may, for example, comprise output data from the application, such as the screen of the application.

At 508, web server 130 renders and provides a video stream of application 142 to client 130 based on the raw data of the application.

At 510, client 120 provides input from the user to web server 130. For example, the user may provide input via one or more controls defined in the application tag, and client 120 may provide this input through the tag to web server 130.

At 512, web server 130 provides application input to application 142 on application server 140 based on the user input. For example, the controls through which the user provided the input may invoke one or more methods associated with application 142. Application 142 may receive and handle the input, providing continuous raw data to web server 130, which continuously renders and provides a video stream of application 142 using the raw data to client 120.

Embodiments of the present disclosure may be useful in a vast number of contexts, as they allow for a resource-intensive application to be provided as part of a web application accessed by a client device without overburdening the resources of the client device. For example, a resource-intensive application may be embedded within a web application as a web widget defined using a toolkit as described herein. Embodiments may, for example, be useful for providing applications involving three-dimensional graphics over the internet. For instance, a developer of a web application may wish to embed certain functionality within the web application that would significantly slow down the functioning of a client device if rendered locally. As such, embodiments of the present disclosure provide a toolkit comprising one or more tags and controls which allow remotely hosted application content to be streamed as video content to the client device accessing the web application, and which allow a user of the client device to provide input to the application while viewing the video stream as if the user were interacting directly with the application.

Furthermore, because embodiments of the present disclosure are separate from any particular web application or resource-intensive application, techniques described herein may allow for resource-intensive or rich content to be remotely provided in any number of contexts. Multiple users of multiple client devices may, for example, receive and interact with a single instance of a resource-intensive application, each of the multiple client devices receiving the same video stream of the application which is rendered and provided by the web server. As such, multiple users may be enabled to collaborate within the same resource-intensive application, each user providing input (e.g., through controls) which is received and directed to the application by the web server. For instance, several users of different client devices may interact with a three-dimensional model of a car in order to manipulate and provide design input without the client devices being tasked with rendering the three-dimensional model using local resources.

Additionally, embodiments of the present disclosure may allow for improved security and privacy, as trust relationships may be established between devices for exchanging data related to a resource-intensive application. Furthermore, techniques for rendering a video stream based on raw data of an application, such as those involving the user of protocols like Blast or RDP, may include secure encoding which protects the security of application data included in the video stream.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method for providing a remoted application to a client device over a network, comprising:

receiving, by at least one computing device and from the client device, a request for the remoted application, wherein the request comprises a tag which identifies a plurality of attributes of the remoted application, the plurality of attributes comprising an identifier for the remoted application, a source for the remoted application, and at least one control associated with the remoted application, the at least one control comprising a wrapper around at least one method of the remoted application;

launching, by the at least one computing device and based on the plurality of attributes identified in the tag, the remoted application;

rendering, by the at least one computing device, a video stream of the remoted application using raw data representing at least real-time visual output of the remoted application;

providing, by the at least one computing device and to the client device, the video stream of the remoted application;

receiving, by the at least one computing device and from the client device, user input provided with respect to the video stream via the at least one control to allow input to be provided to the remoted application;

translating, by the at least one computing device, the user input into application input based at least in part on invoking the at least one method of the remoted application according to at least one parameter of the user input; and providing, by the at least one computing device, the application input to the remoted application.

2. The method of claim 1, wherein the remoted application comprises three-dimensional graphics.

3. The method of claim 1, wherein the remoted application is executed using processing and storage resources of the at least one computing device which is remote from the client device.

4. The method of claim 3, wherein the at least one computing device communicates with an application server securely by either:
communicating with the application server through a trusted connection server; or
establishing an authenticated session with the application server using credentials associated with a user of the client device.

5. The method of claim 3, wherein the remoted application is executed using processing and storage resources of an application server hosted within the at least one computing device.

6. The method of claim 1, wherein the plurality of attributes further comprise a type that defines a platform on which the remoted application is based.

7. The method of claim 1, wherein the at least one control defined in the tag allow the user input to be received by the at least one computing device while the video stream of the remoted application is provided to the client device.

8. A non-transitory computer-readable medium comprising instructions which, when executed by one or more processors, cause the one or more processors to perform a method for providing a remoted application to a client device over a network, comprising:

receiving, by at least one computing device and from the client device, a request for the remoted application, wherein the request comprises a tag which identifies a plurality of attributes of the remoted application, the plurality of attributes comprising an identifier for the remoted application, a source for the remoted application, and at least one control associated with the remoted application, the at least one control comprising a wrapper around at least one method of the remoted application;

launching, by the at least one computing device and based on the plurality of attributes identified in the tag, the remoted application;

rendering, by the at least one computing device, a video stream of the remoted application using raw data representing at least real-time visual output of the remoted application;

providing, by the at least one computing device and to the client device, the video stream of the remoted application;

receiving, by the at least one computing device and from the client device, user input provided with respect to the video stream via the at least one control to allow input to be provided to the remoted application;

translating, by the at least one computing device, the user input into application input based at least in part on invoking the at least one method of the remoted application according to at least one parameter of the user input; and providing, by the at least one computing device and based on the user input, the application input to the remoted application.

9. The non-transitory computer-readable medium of claim 8, wherein the remoted application comprises three-dimensional graphics.

10. The non-transitory computer-readable medium of claim 8, wherein the remoted application is executed using processing and storage resources of the at least one computing device which is remote from the client device.

11. The non-transitory computer-readable medium of claim 10, wherein the at least one computing device communicates with an application server securely by either:
communicating with the application server through a trusted connection server; or
establishing an authenticated session with the application server using credentials associated with a user of the client device.

12. The non-transitory computer-readable medium of claim 10, wherein the remoted application is executed using processing and storage resources of an application server hosted within the at least one computing device.

13. The non-transitory computer-readable medium of claim 8, wherein the plurality of attributes further comprise a type that defines a platform on which the remoted application is based.

14. A computer system, comprising:
at least one computing device comprising one or more processors;
a non-transitory computer-readable medium comprising instructions which, when executed by the one or more processors, cause the one or more processors to perform a method for providing a remoted application to a client device over a network, the method comprising:
receiving, by the at least one computing device and from the client device, a request for the remoted application, wherein the request comprises a tag which identifies a plurality of attributes of the remoted application, the plurality of attributes comprising an identifier for the remoted application, a source for the remoted application, and at least one control associated with the remoted application, the at least one control comprising a wrapper around at least one method of the remoted application;

launching, by the at least one computing device and based on the plurality of attributes identified in the tag, the remoted application;

rendering, by the at least one computing device, a video stream of the remoted application using raw data representing at least real-time visual output of the remoted application;

providing, by the at least one computing device and to the client device, the video stream of the remoted application;

receiving, by the at least one computing device and from the client device, user input provided with respect to the video stream via the at least one control to allow input to be provided to the remoted application;

translating, by the at least one computing device, the user input into application input based at least in part on invoking the at least one method of the remoted application according to at least one parameter of the user input; and providing, by the at least one computing device and based on the user input, the application input to the remoted application.

15. The computer system of claim 14, wherein the remoted application comprises three-dimensional graphics.

16. The computer system of claim 14, wherein the remoted application is executed using processing and storage resources of the at least one computing device which is remote from the client device.

17. The computer system of claim 16, wherein the at least one computing device communicates with an application server securely by either:

communicating with the application server through a trusted connection server; or establishing an authenticated session with the application server using credentials associated with a user of the client device.

18. The computer system of claim 16, wherein the remoted application is executed using processing and storage resources of an application server hosted within the at least one computing device.

19. The computer system of claim 16, wherein the at least one method comprises a JavaScript control.

20. The computer system of claim 14, wherein the one or more plurality of attributes further comprise a type that defines a platform on which the remoted application is based.

* * * * *